United States Patent Office 2,779,782
Patented Jan. 29, 1957

2,779,782

METHOD OF MANUFACTURING DIMETHYL TEREPHTHALATE FROM XYLENE DICHLORIDE

Rudolf Lotz, Klingenberg (Main), Germany, assignor to Vereinigte Glanzstoff-Fabriken A. G., Wuppertal, Elberfeld, Germany, a corporation of Germany No Drawing. Application August 2, 1954, Serial No. 447,387

Claims priority, application Germany August 3, 1953

5 Claims. (Cl. 260—475)

This invention relates to the manufacture of the dimethyl ester of terephthalic acid. More particularly it is directed to the manufacture of said ester from p-xylylene dichloride ($\alpha,\alpha'$-dichloro)-p-xylene.

It has been proposed to manufacture the dimethyl ester of terephthalic acid from p-xylene by oxidation. According to this proposed method, p-xylene is treated with oxygen or oxygen-containing gases until p-toluic acid is formed. This intermediate product is separated, esterified and then oxidized with oxygen by a further reaction, following which the oxidized product is esterified so that the dimethyl ester of terephthalic acid is formed. Such a method is marked by the disadvantage that it can be carried out only by separating out the intermediate products formed and has to be carried out in several stages. Furthermore, this proposed method requires the application of pressure.

It has now been discovered that the dimethyl ester of terephthalic acid can be obtained directly in a single step and with a good yield. To achieve this end, p-xylylene dichloride is oxidized directly with nitric acid of moderate concentration in the presence of methyl alcohol. An important advantage of this method is that the reaction can be conducted in a single operation without the application of pressure. Such an operation without the use of pressure makes it possible to employ clay tile or stoneware containers as the reaction vessel. Such vessels are particularly corrosion-resistant to nitric acid and the nitric gases which are formed.

The operation is carried out in such wise that nitric acid of moderate concentration (40–65%, preferably 50%) is added to p-xylylene dichloride and the reaction mixture is heated to a temperature above the melting point of the p-xylylene dichloride, i. e., the mixture is heated to a temperature of over 100° C., preferably to 105–110° C. The oxidation is carried out in the presence of methyl alcohol, which may be achieved by adding methyl alcohol drop by drop during the heating or immediately after the completion of the oxidation.

It is also possible to conduct methyl alcohol in vaporized form through the reaction mixture. It has been found advisable to reduce the temperature after the principal reaction is finished, i. e., after 5 to 6 hours.

It has also been found advantageous for the purpose of increasing the yield, to add to the reaction mixture phosphoric acid, calcium oxide, or sodium biphosphate, potassium biphosphate or calcium biphosphate and to conduct gaseous hydrogen chloride through the mixture preferably during the reaction. The amount of the aforesaid compounds added to the reaction mixture should be approximately equivalent to the quantity of the nitric acid employed for the oxidation. The gaseous hydrogen chloride is preferably conducted through the mixture in a moderate gentle current. After the careful application of all the steps of the process are completed, the dimethyl ester of terephthalic acid is obtained which contains but very small quantities of terephthalic aldehyde acid ester and p-chloromethyl benzoic acid ester; and contains no nitration products. The following are illustrative examples of this invention.

*Example 1*

350 grams (2 mols) of p-xylylene dichloride, 800 grams of $HNO_3$ (65%) and 300 grams of water are heated for about 6 hours to a temperature of 105° C. in a stoneware vessel while being vigorously stirred. Then 2000 grams of methanol are added dropwise to the reaction mixture while gaseous hydrogen chloride is introduced therein. The mixture is then kept at a temperature of about 100° C. for an additional 7 hours. Upon cooling there deposits out a product which is mostly the dimethyl ester of terephthalic acid (the deposit contains a small quantity of terephthalic aldehyde acid ester). The separation takes place within about one-half hour. The residual material consists of unreacted terephthalic acid which may be reesterified in similar manner. Some p-chloromethyl benzoic acid ester may also be obtained from the mother liquor.

The dimethyl ester of terephthalic acid is obtained in the yield of 80%.

*Example 2*

350 grams (2 mols) of p-xylylene dichloride, 800 grams of $HNO_3$ (65%) and 300 grams of water are heated for about 5 to 6 hours to a temperature of about 100° C. while being vigorously stirred. Then phosphoric acid is added to the reaction mixture while gaseous hydrogen chloride is simultaneously introduced. 2000 grams of methanol are added to the reaction mixture dropwise. The mixture is further heated for about 8 to 10 hours at a temperature of about 100° C. Upon cooling the dimethyl ester of terephthalic acid separates out in solid form, the deposited product containing a small amount, for example, of terephthalic aldehyde acid ester. Upon recrystallization of the product, using methanol for example as the recrystallizing solvent, the dimethyl terephthalate is obtained in pure form having a melting point of 141° C.

*Example 3*

To a mixture of 350 grams (2 mols) of p-xylylene dichloride, 800 grams of $HNO_3$ (65%) and 250 grams of water, the mixture being heated for about 3 to 5 hours to a temperature of about 100° C., gaseous hydrogen chloride is introduced during the period of about 6 to 8 hours. Simultaneously 400 grams of methanol in vapor form are led through the reaction mixture. Upon cooling the reaction mixture the dimethyl ester of terephthalic acid separates out in solid form which may be purified by recrystallization, the recrystallized product having a melting point of 141° C.

I claim:

1. Method of manufacturing the dimethyl ester of terephthalic acid, which comprises reacting p-xylylene dichloride with nitric acid having a concentration in the range of about from 40 percent to 65 percent, at a temperature in the range of about 105° to 110° C., in the presence of methanol.

2. Method in accordance with claim 1 wherein the nitric acid has a concentration of approximately 50%.

3. Method in accordance with claim 1 wherein the reaction is carried out by passing a stream of gaseous hydrogen chloride through the reaction mixture.

4. Method in accordance with claim 1 wherein the reaction is carried out by passing a stream of gaseous hydrogen chloride through the reaction mixture, and in the presence of a member of the group consisting of phosphoric acid, calcium oxide, sodium biphosphate, potassium biphosphate, and calcium biphosphate.

5. Method in accordance with claim 1 wherein the methyl alcohol is introduced into the reaction mixture in the vapor state.

References Cited in the file of this patent

UNITED STATES PATENTS 2,610,211     Darragh et al. _____ Sept. 9, 1952